Oct. 2, 1956 W. J. CLARK ET AL 2,765,179
COMBINED AUTOMOBILE TAIL LAMP AND FUEL TANK INLET
Filed Sept. 23, 1953 2 Sheets-Sheet 1
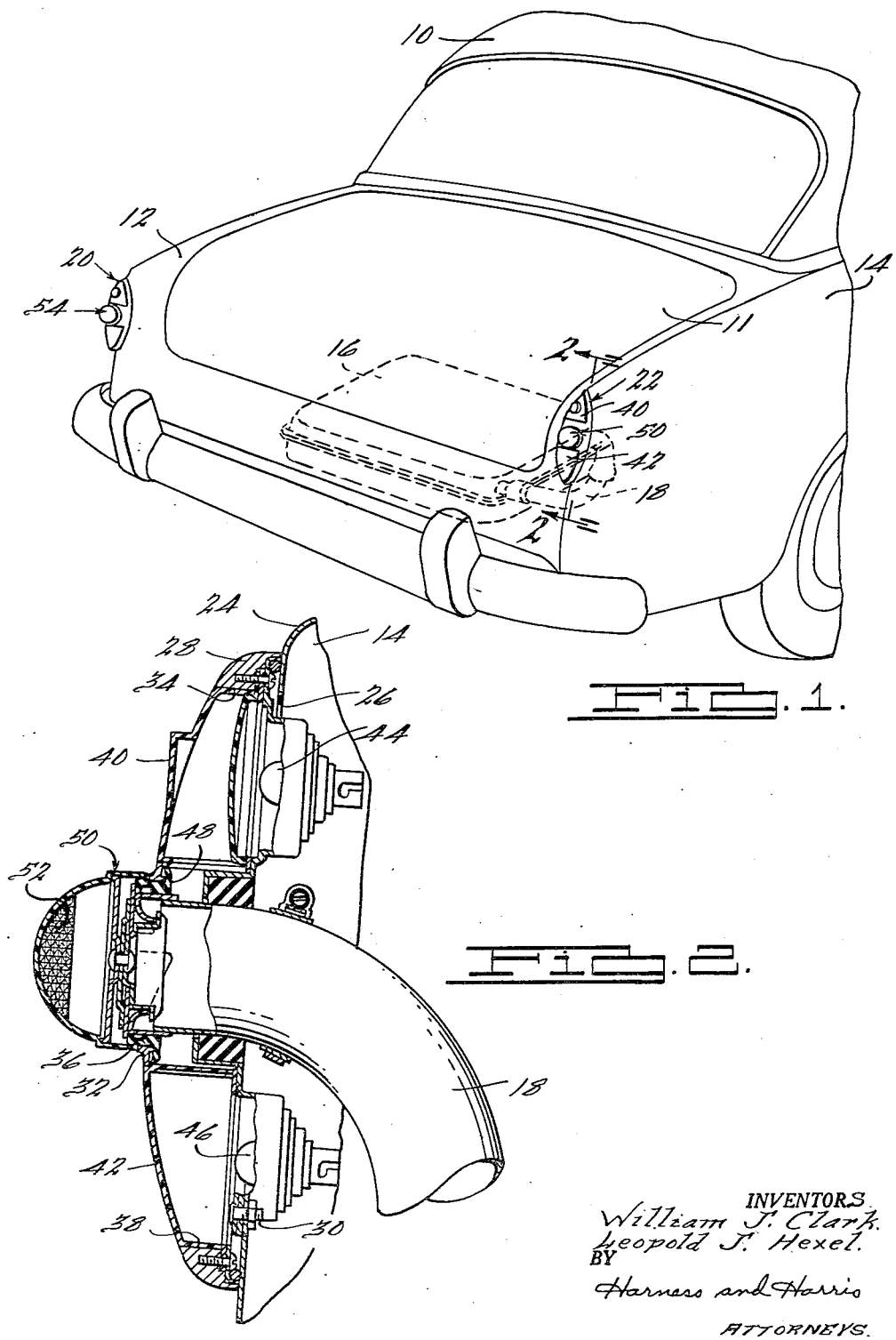
INVENTORS
William J. Clark
Leopold J. Hexel
BY
Harness and Harris
ATTORNEYS

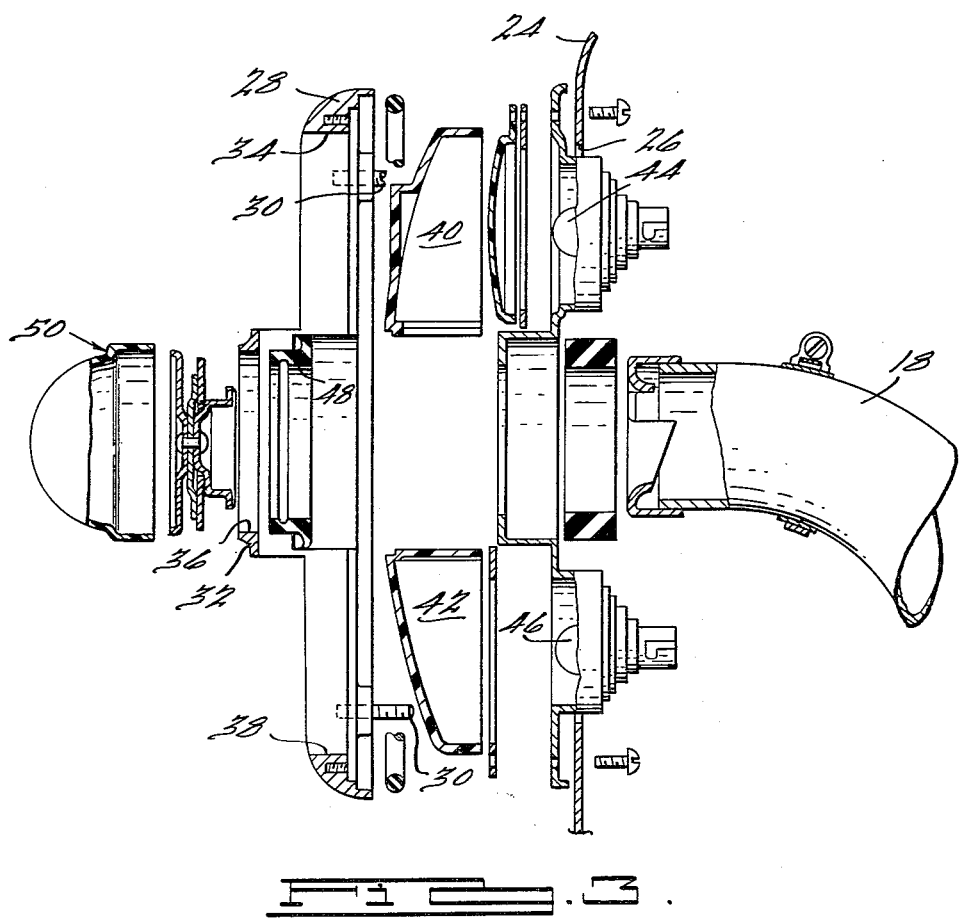

United States Patent Office 2,765,179
Patented Oct. 2, 1956

2,765,179

COMBINED AUTOMOBILE TAIL LAMP AND FUEL TANK INLET

William J. Clark, Royal Oak, and Leopold J. Hexel, Detroit, Mich., assignors to Chrysler Corporation, Highland Park, Mich., a corporation of Delaware Application September 23, 1953, Serial No. 381,945

3 Claims. (Cl. 280—152)

This invention relates to motor vehicle bodies and more particularly to a combined tail lamp and fuel tank inlet assembly for use thereon.

It is a principal object of the invention to provide a fuel tank inlet that is so incorporated in the tail lamp assembly of a motor vehicle as to be inconspicuous and fitted with a removable closure means rather than a hinged closure of the type currently employed on some vehicles. Hinged closures provide objectionable complications in connection with the tail lamp wiring and latching devices to control them and these complications are avoided by our novel fuel tank inlet mounting.

It is another object of the invention to provide a fuel filler pipe which extends through the lamp lens housing and is sealed therein to prevent spilling fuel on the interior of the associated lights.

In the drawing:

Fig. 1 is a perspective view of a rear portion of an automobile incorporating our invention;

Fig. 2 is a vertical sectional view taken on the line 2—2 of Fig. 1; and

Fig. 3 is an exploded view of the device shown in Fig. 2.

Referring to the drawings Fig. 1 illustrates a perspective view of the rear portion of an automobile body 10 including a conventional hinged deck lid 11, a left rear fender portion 12, a right rear fender portion 14, and a fuel tank 16 having a filler pipe 18.

A tail lamp assembly or lamp fixture 20 is illustrated as mounted on fender portion 12 and a tail light assembly or lamp fixture 22 is illustrated as mounted on fender portion 14. The lamp fixtures 20 and 22 are complementary and symmetrically located on opposite sides of the automobile body. It should be noted that the fuel filler pipe 18 is illustrated in Fig. 1 as associated with the tail light assembly 22 in a manner to be described herein although it is to be understood that, if desired, the fuel filler pipe 18 may be associated with the tail light assembly on the left rear fender and the tail light assemblies 20 and 22 may be interchanged to accommodate such an installation.

Referring to Fig. 2 of the drawings it will be seen that the rear fender portion 14 is provided with a substantially vertically extending surface 24 having an elongated opening 26 therein. A frame structure 28 of elongated contour is fixed to the fender portion 14 in registry with the opening 26 by means of bolts 30.

The frame structure 28 has a frontal face 32 which extends vertically and is provided with a plurality of vertically spaced apertures 34, 36 and 38 therein. A lens 40 is mounted in the frame structure 28 in registry with aperture 34 and a lens 42 is mounted in registry with aperture 38. Conventional lights 44 and 46 are carried by the frame structure 28 behind lenses 40 and 42, respectively. The lenses 40 of lamp fixtures 20 and 22 are complementary to each other in size, coloring and general location in the lamp fixtures. Similarly the lenses 42 of lamp fixtures 20 and 22 are complementary.

Fuel filler pipe 18 is mounted on a rubber-like gasket 48 which is carried by the frame structure 28 around the periphery of aperture 36. A suitable closure means which is illustrated as a cap 50 is provided for closing the end of fuel filler tube 18 in a conventional manner.

The cap 50 is illustrated as provided with a retro-directive reflector 52 mounted on the outer vertical surface thereof. If desired, the tail light assembly 20 on the other fender portion 12 of the vehicle may be provided with a lens 54 in the form of a matching retro-directive reflector. Similarly the cap 50 may, if desired, be so ornamented as to match a back up light provided in conjunction with lens 54 of the tail light assembly 20.

The lights 44 and 46 and their counterparts in tail light assembly 20 may be used as conventional stop lights, tail lights, back up lights or any combination of these conventional motor vehicle lights.

We claim:

1. In a motor vehicle first and second spaced, complementary lamp fixtures symmetrically located on opposite sides of the rear portion thereof, each of said lamp fixtures including means forming a plurality of apertures, the apertures of said first lamp fixture being complementary to the apertures of said second lamp fixture in size and location, a fuel tank filler pipe supported by said means in registry with one of the apertures in said first lamp fixture, a removable cap caried by said filler pipe, a lamp lens having the same outward shape as said cap supported on said second lamp fixture in registry with the opening in said second lamp fixture that is complementary to said one aperture in said first lamp fixture, and additional lamp lenses supported on said lamp fixtures in registry with the remaining apertures therein with each lamp lens of said first lamp fixture having a mating lamp lens in said second lamp fixture that is complementary thereto in size, coloring and location in its respective lamp fixture.

2. In a motor vehicle a pair of spaced, complementary lamp fixtures symmetrically located on opposite sides of the rear portion thereof, each of said lamp fixtures compising a supporting frame structure having three apertures formed therein, one of said lamp fixtures having three lamps lenses respectively supported by said frame structure in registry with the apertures therein and the other of said lamp fixtures having two lamp lenses respectively supported by said frame structure in registry with two of the apertures in said last mentioned lamp fixture, said two lamp lenses respectively resembling two of the above mentioned three lamp lenses in external contour, a fuel tank filler pipe supported by said frame structure in registery with the third aperture of said last mentioned lamp structure and closure means removably carried by said filler pipe, said closure means and one of the three lamp lenses of said first mentioned lamp fixture being provided with the same external contour.

3. In a motor vehicle first and second spaced, complementary lamp fixtures symmetrically located on opposite sides of the rear portion thereof, each of said lamp fixtures including means forming a plurality of lamp lenses, the number of lamp lenses in said second lamp fixture exceeding the number of lamp lenses in said first lamp fixture by one, a fuel tank filler pipe supported by said first lamp fixture, a removable cap carried by said filler pipe, one of the lamp lenses of said second lamp fixture having the same outward shape and location in its respective lamp fixture as said cap, the remaining lamp lenses of said second lamp fixture each having its counterpart in one of the lamp lenses of said first lamp fixture with respect to size, coloring and relative location in its respective lamp fixture.

References Cited in the file of this patent

UNITED STATES PATENTS

| | | |
|---|---|---|
| 1,905,568 | Radke | Apr. 25, 1933 |
| 2,314,710 | Keller | Mar. 23, 1943 |
| 2,606,772 | Mead | Aug. 12, 1952 |
| 2,651,028 | Dupree | Sept. 1, 1953 |